UNITED STATES PATENT OFFICE.

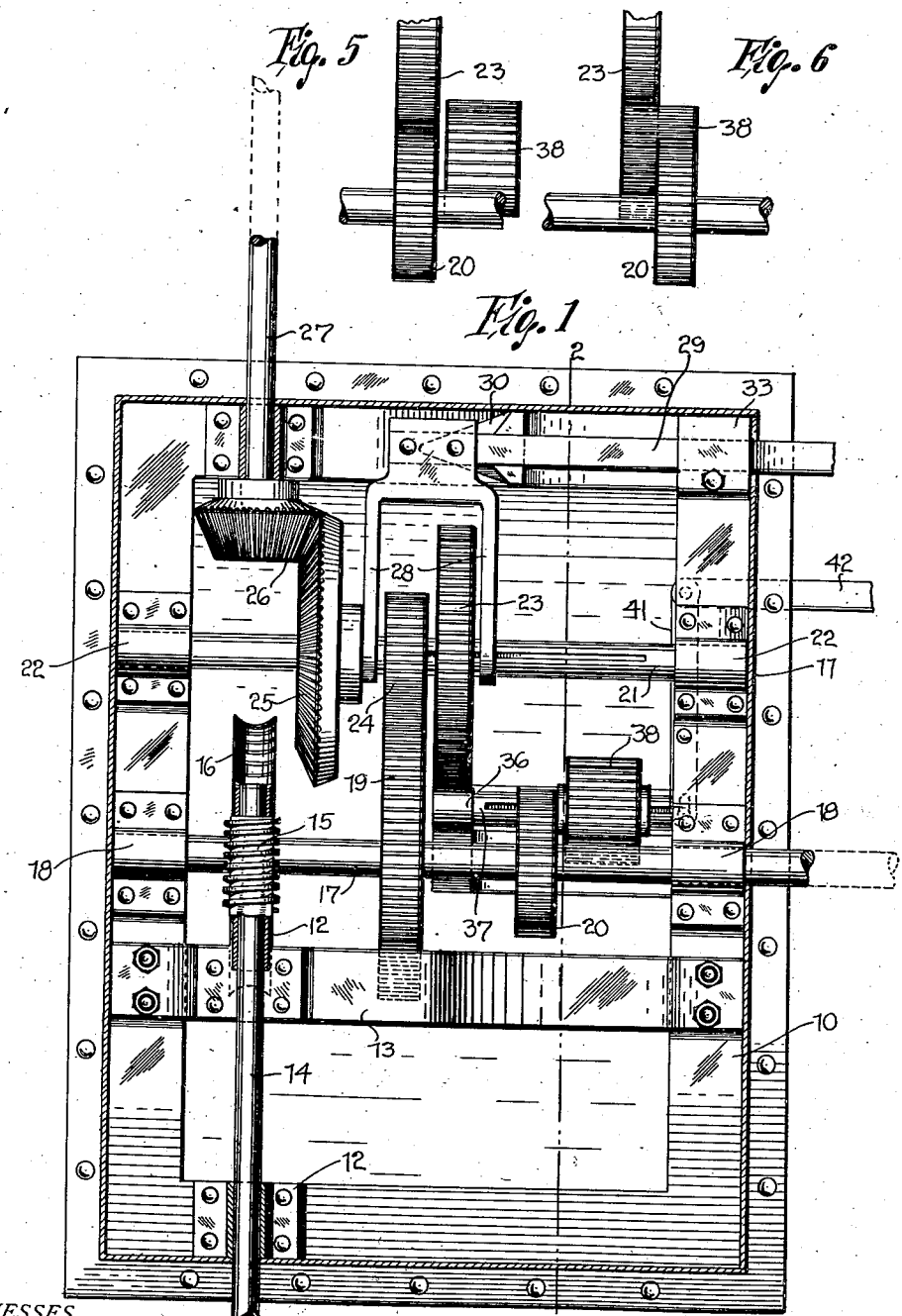

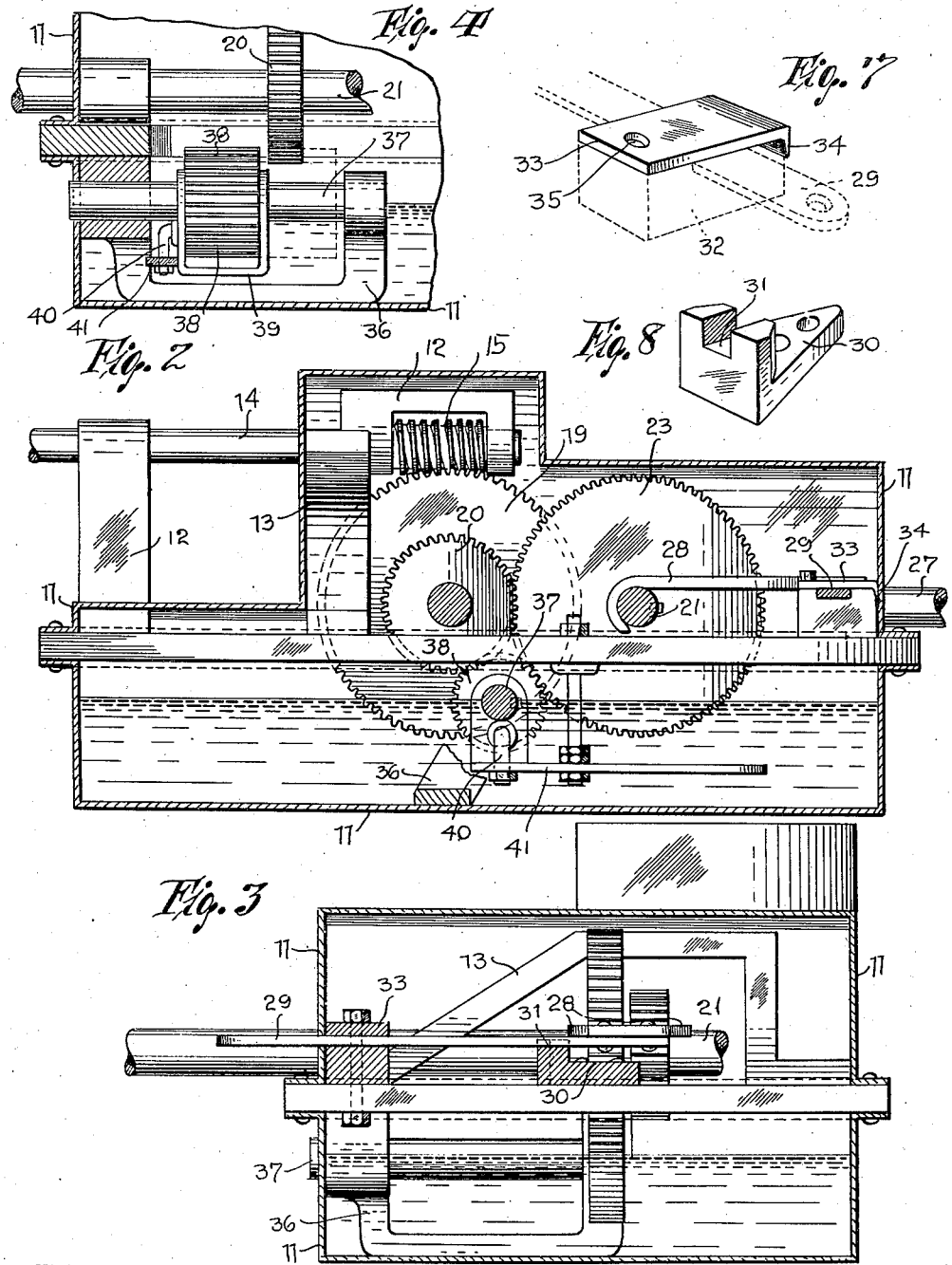

LEAMAN WHITLOCK AND IRA S. WHITLOCK, OF EPHRATAH, NEW YORK.

TRANSMISSION-GEARING.

1,041,541.  Specification of Letters Patent.  Patented Oct. 15, 1912.

Application filed March 26, 1912. Serial No. 686,243.

*To all whom it may concern:*

Be it known that we, LEAMAN WHITLOCK and IRA S. WHITLOCK, citizens of the United States, residing at Ephratah, in the county of Fulton and State of New York, have invented certain new and useful Improvements in Transmission-Gearing, of which the following is a specification, reference being had therein to the accompanying drawing.

This invention relates to gearing.

One object of the invention is to provide an improved form of change speed gearing.

A second object of the invention is to provide an improved means for shifting certain of the gears in such a gearing.

With the above and other objects in view as will be hereinafter apparent, this invention consists in general of certain novel constructions, arrangements and combinations of parts, as will be hereinafter fully described, illustrated in the accompanying drawings, and specifically claimed.

In the accompanying drawings, like characters of reference indicate like parts in the several views, and Figure 1 is a plan view of the gearing in its case with the top removed,—certain of the parts being shown in section, better to illustrate the construction. Fig. 2 is a section on the line 2—2, Fig. 1. Fig. 3 is a section taken at right angles to Fig. 2, certain of the parts being omitted for the sake of clearness. Fig. 4 is a detail section showing certain gearing used in connection with the reverse movement. Fig. 5 is another view of this gear showing the same in one position. Fig. 6 is a third view showing this reverse gear in a second position. Fig. 7 is a certain guide used in connection with a portion of the gear shifting mechanism. Fig. 8 is a second guide used in connection therewith.

This gear arrangement is preferably supported in a rectangular frame 10 and to this frame are attached top and bottom casings 11 so that the gears may run in oil.

It will be understood that the gearing may be used in the position indicated in Figs. 2 and 3, or it may be inverted so that what is now the top casing will then become the lower casing. This can be done in either manner as may be found desirable.

Journaled in suitable bearings 12 carried on the frame and on a cross bar 13, is a shaft 14 which will be hereinafter referred to as the drive shaft. On this shaft 14 is a worm 15 which meshes with a worm wheel 16 carried on a transverse shaft 17. This shaft 17 is supported in bearings 18 on the side members of the frame and on this shaft is fixed a large gear 19 and a smaller gear 20. Parallel with the shaft 17 extends a shaft 21 supported in bearings 22. On the shaft 21 are splined gears 23 and 24 which may be made to mesh respectively with the gears 20 and 19. On the shaft 21 is also a beveled gear 25 which meshes with a beveled gear 26 carried on a shaft 27 which will be hereinafter referred to as the changeable speed shaft.

In order to slide the gears 23 and 24 along the shaft 21, there is provided a yoke 28 whose arms embrace gears 23 and 24 and this yoke is carried by a bar 29 slidably mounted in a guide block 30 suitably slotted as at 31 to receive the seed bar 29. There is also provided a second slotted guide block 32 for this bar and the slot in this block is closed by a cover plate 33 having a downwardly bent beveled end 34 extending over the side of the guide block and being provided with a bolt hole 35 for the reception of a suitable bolt. By means of this construction a single bolt hole serves to hold this cover plate in place. The bar 29 is connected to a lever located in any suitable position so that it may be easy of access and afford means for moving the bar to and fro. It will be seen that as the bar is moved in one direction the gears 20 and 23 will be brought into mesh while if moved in the opposite direction the gears 19 and 24 will be brought into mesh. It is to be noted that when the bar is in its central position, the gears 23 and 24 will be out of mesh entirely. In order to reverse the direction of movement of the shaft 27 there are provided suitable bearings 36 wherein is mounted a shaft 37 and on this shaft is splined a gear 38 which is preferably double the width of either the gear 23 or 20. This gear 38 is slid along the shaft 37 by means of a yoke 39 wherethrough projects a pin 40 which is connected by the slotted end of a lever 41, the other end of said lever being engaged by a bar 42 so that an operating lever may be attached thereto located adjacent the operating lever 29. When it is desired to reverse the direction of movement the bar 29 is moved to bring the gears 23 and 24 intermediate the gears 20 and 19. Thereupon the gear 38 is moved into mesh with the gear 20 and then further moves until it meshes with the gear 23 as indicated in Fig. 6.

It is to be noted that the ends of the arms of the yoke 39 surround the shaft 37 while the ends of the arms of the yoke 28 are hooked over the shaft 21 as can readily be seen by reference to Fig. 2. The shaft 17 may have either end elongated so that it may be used for a power shaft, as can be seen by reference to Fig. 9 wherein the shaft is shown as running a dynamo. This dynamo may, if desired, be used for lighting a motor boat, while the changeable speed shaft may be used for running its propeller.

There has thus been provided a simple and efficient device of the kind described, and for the purpose specified. It is obvious that many minor changes may be made in the form and construction thereof without departing from the material principles thereof, and it is therefore not wished to confine the invention to the exact form herein shown and described but it is wished to include all such as properly come within the scope of the appended claims.

Having thus described the invention, what is claimed as new, is:—

1. In gearing of the class described, a group of sliding gears, a shaft whereon said gears slide, and means to move said gears on said shaft comprising a yoke having ends hooked over said shaft, a bar extending parallel to the shaft and secured to said yoke, and means to guide said bar in parallelism with the shaft.

2. In gearing of the class described, a group of sliding gears, a shaft whereon said gears slide, and means to move said gears on said shaft comprising a yoke having ends hooked over said shaft, a bar extending parallel to the shaft and secured to said yoke, and means to guide said bar in parallelism with the shaft, said means including a slotted guide block provided with a cover plate having a turned down end to engage one side of the guide block, and securing means for the other end of said cover plate whereby a single bolt serves to hold the cover plate in fixed position.

In testimony whereof we hereunto affix our signatures in presence of two witnesses.

LEAMAN WHITLOCK.
IRA S. WHITLOCK.

Witnesses:
Jos. F. Wershershan,
Irvin Getman.